United States Patent
Bradley et al.

(10) Patent No.: US 12,254,529 B2
(45) Date of Patent: Mar. 18, 2025

(54) CONTEXTUAL AVATAR PRESENTATION BASED ON RELATIONSHIP DATA

(71) Applicant: AT&T Intellectual Property I, L.P., Atlanta, GA (US)

(72) Inventors: Nigel Bradley, Canton, GA (US); Eric Zavesky, Austin, TX (US); James Pratt, Round Rock, TX (US); Ari Craine, Marietta, GA (US); Robert Koch, Peachtree Corners, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 64 days.

(21) Appl. No.: 17/820,319

(22) Filed: Aug. 17, 2022

(65) Prior Publication Data
US 2024/0062430 A1 Feb. 22, 2024

(51) Int. Cl.
*G06T 11/00* (2006.01)
*G06T 3/40* (2024.01)

(52) U.S. Cl.
CPC ............ *G06T 11/00* (2013.01); *G06T 3/40* (2013.01); *G06T 2210/36* (2013.01); *G06T 2210/62* (2013.01)

(58) Field of Classification Search
None
See application file for complete search history.

(56) References Cited

U.S. PATENT DOCUMENTS

| | | | |
|---|---|---|---|
| 2009/0172539 A1* | 7/2009 | Bates | G06F 3/011 715/706 |
| 2009/0183071 A1* | 7/2009 | Smith | G06F 3/01 715/706 |
| 2010/0045697 A1* | 2/2010 | Reville | G06F 3/0481 345/619 |
| 2010/0079467 A1* | 4/2010 | Boss | A63F 13/30 345/474 |
| 2010/0115426 A1* | 5/2010 | Liu | G06Q 10/107 715/757 |
| 2010/0169798 A1* | 7/2010 | Hyndman | A63F 13/30 715/757 |
| 2010/0245257 A1* | 9/2010 | Cragun | G06F 3/011 345/173 |
| 2010/0313138 A1* | 12/2010 | Pare | A63F 13/12 715/744 |

(Continued)

*Primary Examiner* — Anh-Tuan V Nguyen
(74) *Attorney, Agent, or Firm* — Guntin & Gust, PLC; Atanu Das

(57) ABSTRACT

The disclosed technology is directed towards presenting an avatar in a virtual reality environment in different ways to different users, based on relationship data including a familiarity level and trust level with each other user. The familiarity level data and/or trust level data can be updated with each encounter with another user. The presentations of the same avatar can be different to the other users encountered at the same time, e.g., a lower resolution avatar presented to a less familiar and/or less trusted other user, a higher resolution avatar presented to a more familiar and/or more trusted other user. Audio volume and/or clarity may be similarly modified based on relationship data. A user having an encounter with another user may have a mirror view of the user's own avatar, and can improve or degrade the avatar's appearance (and/or aural output) during the encounter.

20 Claims, 15 Drawing Sheets

(56) References Cited

U.S. PATENT DOCUMENTS

| | | | |
|---|---|---|---|
| 2011/0029889 A1* | 2/2011 | Karstens | A63F 13/35 |
| | | | 715/745 |
| 2012/0131478 A1* | 5/2012 | Maor | G06T 19/20 |
| | | | 715/757 |
| 2012/0188277 A1* | 7/2012 | Hebbar | A63F 13/79 |
| | | | 345/629 |
| 2019/0105568 A1* | 4/2019 | Platt | A63F 13/52 |
| 2020/0034025 A1* | 1/2020 | Brady | G09B 19/00 |
| 2021/0339143 A1* | 11/2021 | Bar-Zeev | G06F 3/011 |
| 2022/0124286 A1* | 4/2022 | Punwani | G06F 3/04815 |
| 2022/0286311 A1* | 9/2022 | Rowe | G06T 19/006 |

* cited by examiner

CONTEXTUAL AVATAR PRESENTATION BASED ON RELATIONSHIP DATA

TECHNICAL FIELD

The subject application relates to the presentation of avatars in general, and more particularly to presenting a user's avatar based on a relationship to another user, and related embodiments.

BACKGROUND

Avatars represent users in many different virtual environments, including social settings, work settings, meetings, events, presentations and others. A user's avatar is generally perceived by other users in such settings in the same way, independent of any context.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
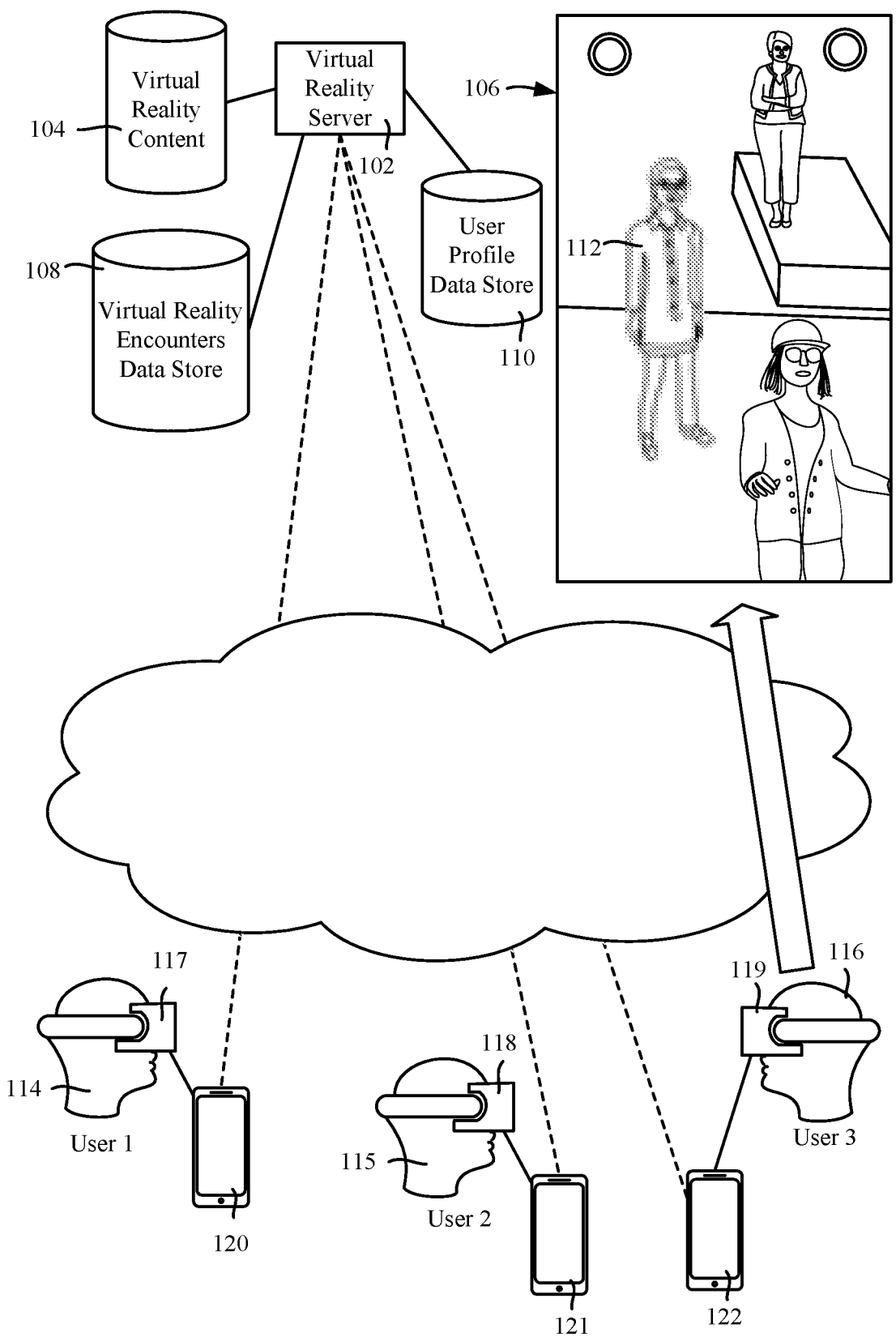
FIG. 1 is a block diagram of an example system and representation of a virtual environment for presenting an avatar in the virtual environment to other users based on relationship data (e.g., trust and/or familiarity levels), in accordance with various aspects and embodiments of the subject disclosure.

The technology described herein is generally directed towards enabling a user within a virtual reality environment to control the perception level (e.g., appearance and/or audio level) by which his or her avatar is presented to other users. The technology described herein also allows a user to control the perception level by which they see other user avatars.

The perception level of other avatars experienced by the user, and the user avatar experienced by other users, is generally based on prior relationship data obtained via one or more previous encounters, and possibly other information such as manual input. The relationship data, maintained by the technology described herein, can include, but is not limited to, familiarity levels and/or trust levels between users.

In example embodiments, the appearance of a user's avatar can vary in association with the relationship data, including familiarity levels and/or trust levels of that user with each of the other user(s) encountered. For example, resolution, opacity, color and/or the like can be varied to alter the avatar's appearance, such as to present a very low resolution avatar to others where there is little familiarity and/or trust, a medium resolution avatar for some familiarity and/or trust, and a high resolution avatar for substantial familiarity and/or trust. Audio output of an avatar can also be varied based on familiarity and/or trust, e.g., ranging from silence (or slightly) hearing for low familiarity and/or low trusted users, to fully hearing for high familiarity and/or trusted users. The clarity of the audio output can likewise be adjusted based on the relationship data.

In this way, a user in a virtual reality environment can contextually and easily perceive avatars of other users in that environment with respect to their relationship with other user(s), such as based on respective levels of familiarity and/or trust with the respective other users. This provides a useful way for a user to be able to perceive the avatars of other users at a level of visual and aural clarity depending on their relationship data obtained from encounters with those. Similarly, it is useful for the other users to be presented with a generally comparable presentation of the user's avatar.

As used in this disclosure, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, can be utilized interchangeably in the application, and can refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "user equipment," "device," "communication device," "mobile device," "subscriber," "customer entity," "consumer," "customer entity," "entity" and the like may be employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, including, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.11 wireless technologies and/or legacy telecommunication technologies.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

FIG. 1 shows a virtual reality server 102, which based on virtual reality content 104, outputs a virtual environment 106 in which one or more virtual reality users can exist, e.g., as avatars representing actual users. The virtual reality server 102 is also coupled to a virtual reality encounters data store 108 and user profile data store 110 for avatar presentation, including the avatar 112, intentionally presented in a low resolution representation, based on relationship data (e.g., familiarity data and/or trust data) with respect to another user, as described herein.

As described herein, a number of users may be equipped with virtual reality viewing devices and/or audio presentation devices such as speakers or headphones. In the example of FIG. 1, three users 114-116 (User 1, User 2 and User 3) are shown, with virtual reality headsets 117-119, respectively, and communications devices 120-122 respectively. These users may exist within the same virtual reality environment 106. Although not explicitly shown, it is understood that other output (and input) devices may be associated with users in the environment, e.g., wearable devices, microphones, cameras, audio output devices (e.g., earbuds, headphones, speakers and so on), and the like. Further, although a virtual reality environment is shown in FIG. 1, it is feasible for other user(s) to experience the environment in other ways, such via a two-dimensional display device.

In the example of FIG. 1, the virtual reality content is presented to the users 114-116 via the virtual reality server 102, which is in communication with the user profile data store 110, e.g., with profile data for each user. The virtual reality encounters data store 108 (e.g., a database) records various data related to user encounters that occur within the virtual reality environment 106, as well as within other virtual reality environments. That is, the user profiles and virtual reality encounters data store may serve more than one virtual reality environment such that users may encounter each other in more than one virtual reality space.

In the example shown, user 2's (115) view of user 1 (114) is shown when user 2 and user 1 encounter each other within the virtual reality environment 106. An encounter may be detected in a number of different ways. In one embodiment, an encounter may be detected by the virtual reality server detecting the field of view direction of user 1 and user 2 and determine that they are looking in each other's direction at the same time, for a threshold period of time. In another embodiment, an encounter may be detected when user 1 and user 2 are both looking at each other in their field of view and are also within a proximate distance to each other. In yet another embodiment, an encounter may be detected when user 1 and user 2 are talking to each other, e.g., independent of each user's field of view; (for example one user may be sitting in a virtual event in a row behind another user, and the two users can conversing without necessarily looking at each other). In one instance, the determination that user 1 and user 2 are talking to each other may be made by the virtual reality server analyzing the virtual reality content and avatar activity within the content to recognize that user 1 and user 2 are the only avatars at which each other is looking, within their field of view, or within a specified range within their field of view. In this manner, it may be inferred that user 2 is conversing with user 1.

Figure 2:
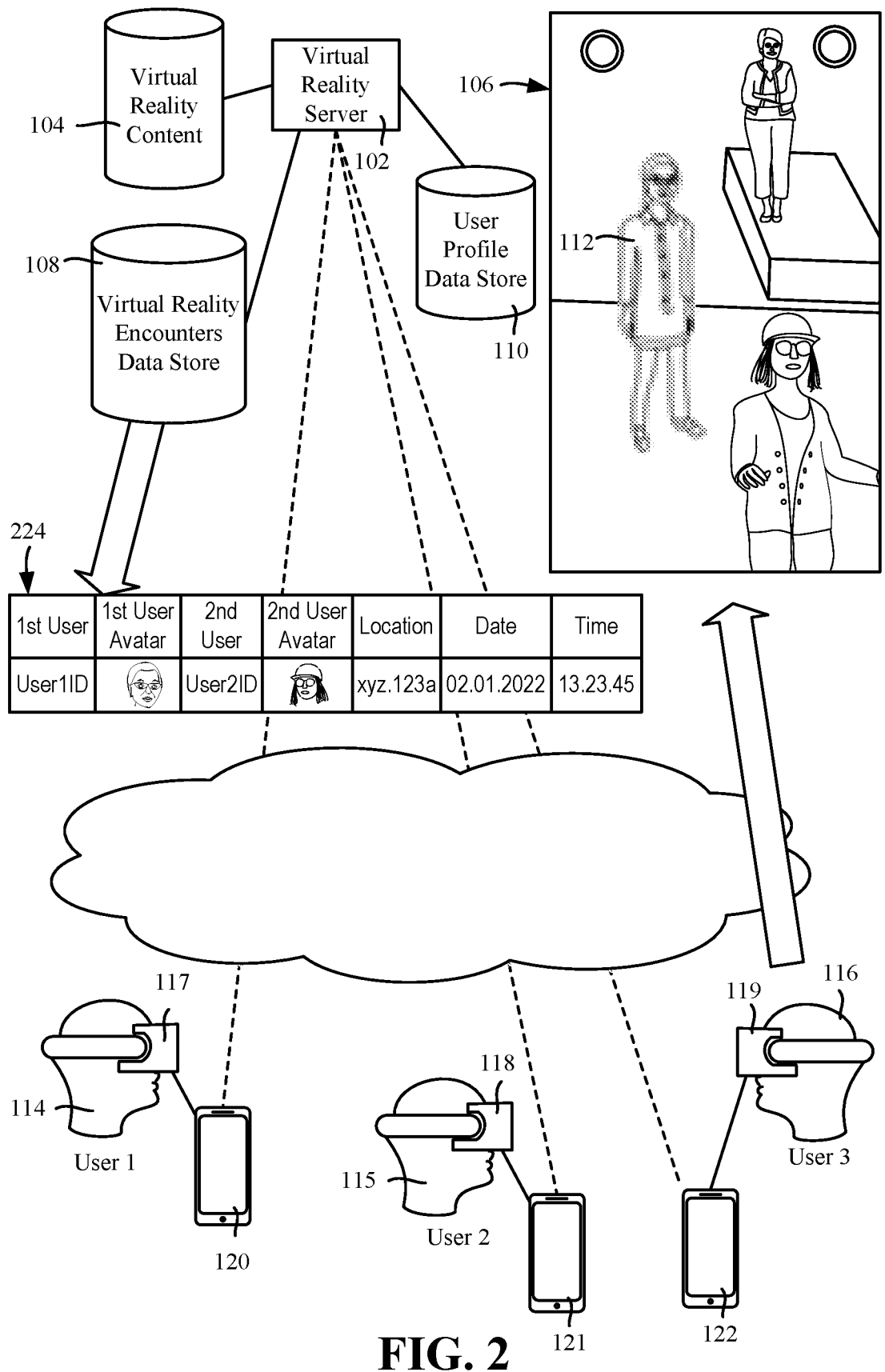
FIG. 2 is a block diagram of an example system and representation of a virtual environment for presenting an avatar in a virtual environment to other users based on relationship data obtained via one or more encounters, maintained in an encounters data store, in accordance with various aspects and embodiments of the subject disclosure.
Figure 3:
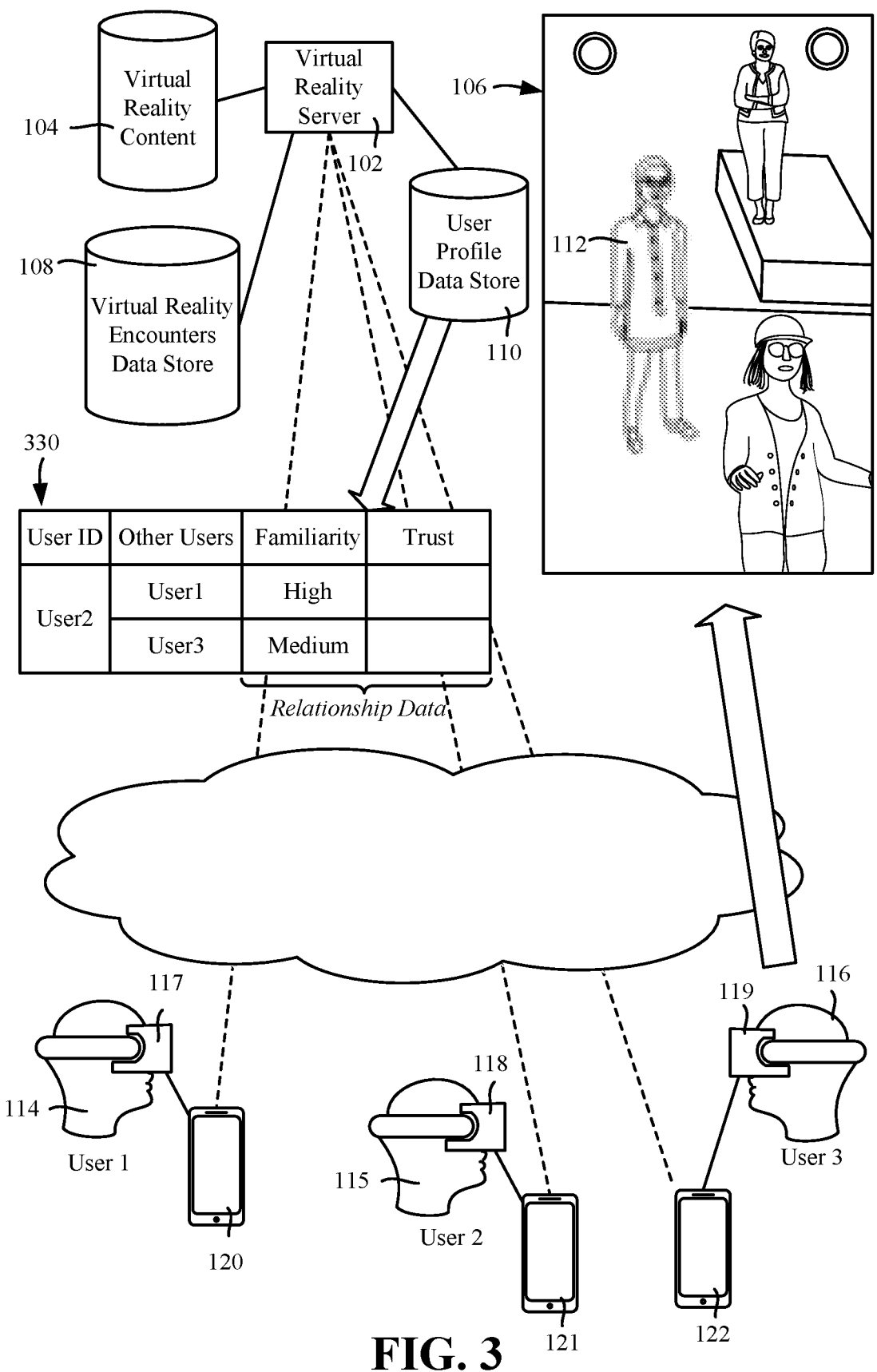
FIG. 3 is a block diagram of an example system and representation of a virtual environment for presenting an avatar in a virtual environment to other users based on relationship data maintained in a user profile data store, in accordance with various aspects and embodiments of the subject disclosure.
Figure 4:
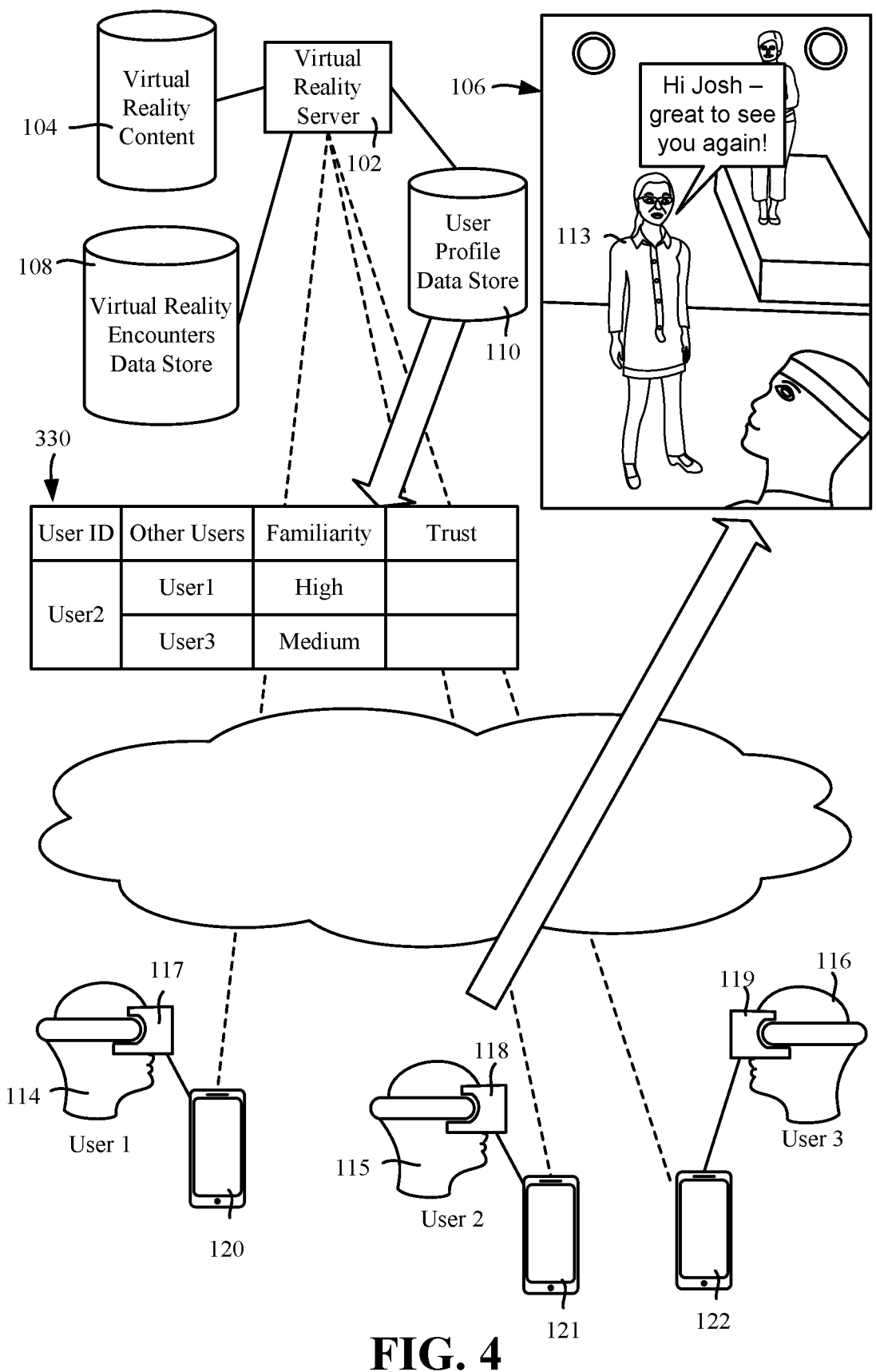
FIG. 4 is a block diagram of an example system and representation of a virtual environment for presenting an avatar in a virtual environment to other users based on relationship data, including presenting a higher resolution representation of the avatar to a familiar user, in accordance with various aspects and embodiments of the subject disclosure

As shown in FIG. 2, upon the detection of an encounter, a record 224 of the encounter is made in the virtual reality encounters data stare 108. The record of the encounter may include user identifiers (IDs) for each user, the image representative of the avatar that was used by each user at the time of the encounter, a location in virtual reality space coordinates of the encounter, and the date and time of the encounter.

In recording the encounter, a record 330 may also be made in the user profile data store 110. For example, for user 2's profile, if user 2 (115) has a long conversation with user 1 (114) or if user 2 (115) has many encounters with user 1 (114), the familiarity of user 1 (114) to user 2 (115) may be recorded as high in user 2's profile data. Likewise, user 3 (116) may have a lower familiarity for user 2 (115). A lower familiarity may be due to a lower number of encounters, or no direct encounters. It also may be that user 2 (115) and user 3 (116) have only had indirect encounters. An indirect encounter may be recorded for example for user 2 (115) with user 3 (116) if user 2 (115) has seen user 3 (116) in a virtual reality environment but not have had a direct conversation or mutual field of view line of sight within that environment. Still further, a familiarity score can be automatically reduced, such as if two users (their avatars) quickly walk past one another without any significant speaking, without pausing and/or without "eye" (field of view) contact.

If user 2 (115) has a subsequent encounter with user 1 (116) in the same virtual reality environment 106 or a different virtual reality environment, the virtual reality server 102 may retrieve from the user profile data store 110 the level of familiarity of user 1 (114) to user 2 (115). If the level of familiarity is sufficiently high, the avatar 112 for user 1 (114) may be presented in full visual resolution to user 2 (115), as shown by the modified appearance of the avatar, now labeled 113. Furthermore, the level of audio volume and/or the clarity of audio spoken by user 1 (114) to user 2 (114) may be at full resolution as well.

Figure 5:
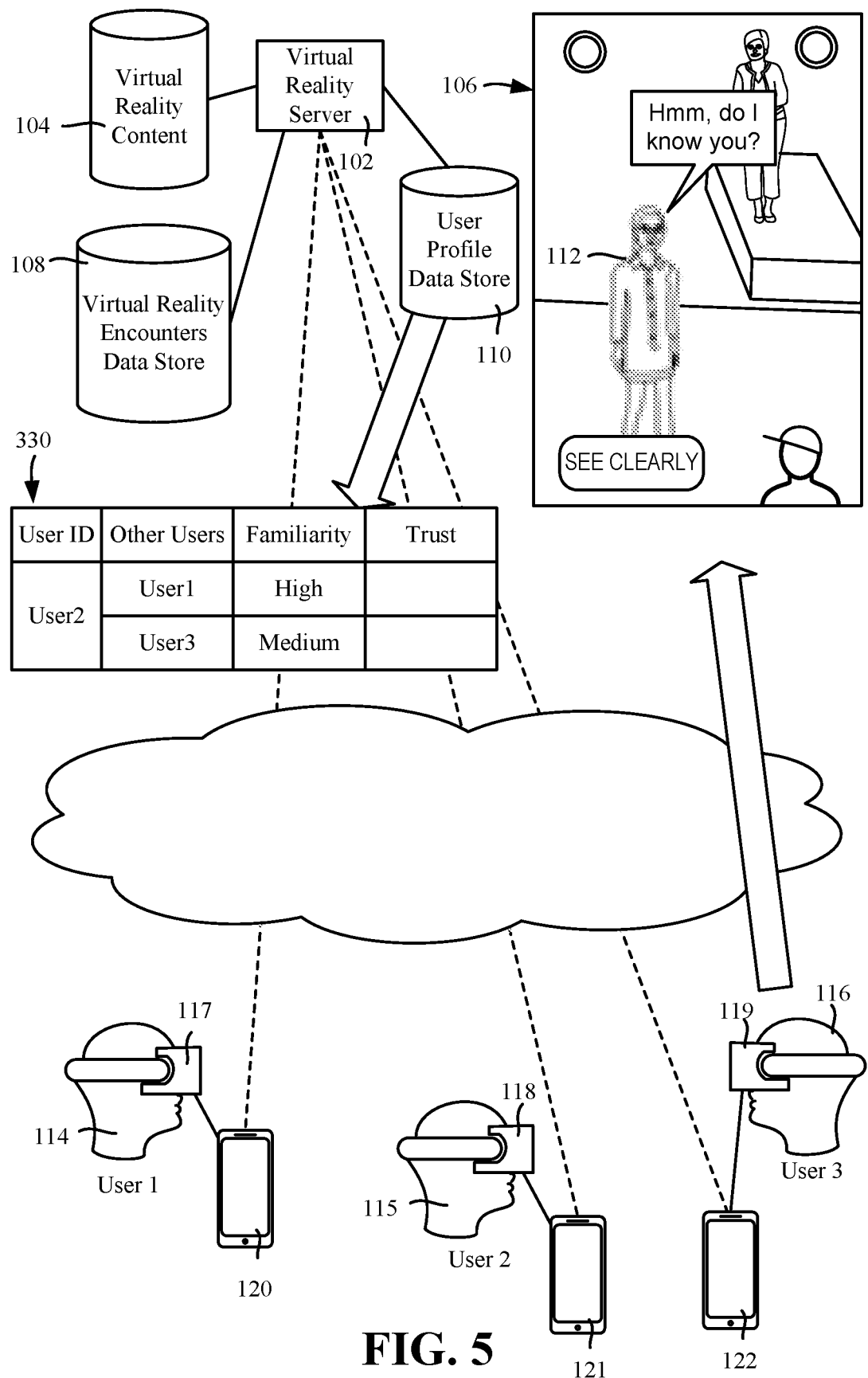
FIG. 5 is a block diagram of an example system and representation of a virtual environment for presenting an avatar in a virtual environment to other users based on relationship data, including presenting a lower resolution representation of the avatar to less familiar user, with an interface to modify the resolution, in accordance with various aspects and embodiments of the subject disclosure.

In a similar manner, as represented in FIG. 5, if the user 3 (116) encounters user 1 (114) and user 1 (114) has a lower level of familiarity to user 3 (116), the avatar (e.g., 112) for user 1 (114) may be altered in its rendering by the VR server before it is presented to user 3 (116). Therefore, the presentation of the avatar may look different to user 2 (115), and user 3 (116), even at the same time. In this manner, any user may have an easy visual means to best see other avatars of users with whom they have a high level of familiarity.

At any time however, a user may selectively upgrade, e.g., to the best available appearance, or degrade the presentation resolution of an avatar. The level of appearance (visual and/or aural) of an avatar may be based on the level of familiarity. At the lowest level of familiarity, for instance, an avatar may disappear completely, allowing a user to see and hear only the other users with which they are sufficiently familiar. This can be varied by interaction with the system, e.g., via interactive control(s), voice command(s), gesture(s) and the like.

Figure 6A:
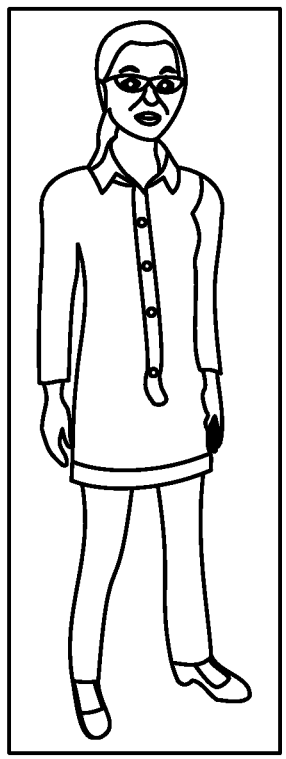
FIGS. 6A and 6B are example representations of a higher resolution and lower resolution avatar, respectively, in accordance with various aspects and embodiments of the subject disclosure.
Figure 6B:
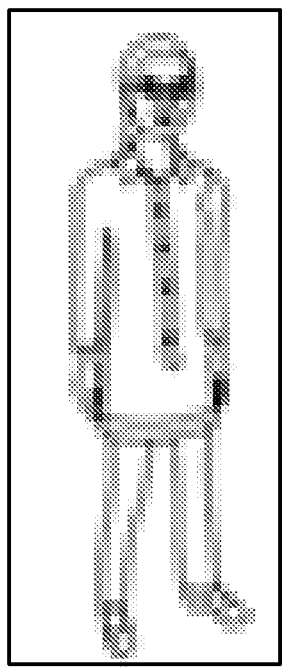

FIG. 6A and FIG. 6B are larger versions of a full resolution and low resolution avatars 113 and 112 respectively as perceived by different users and/or at different times. There may be only two resolutions, or three resolutions (for each of low, medium or high relationship data (familiarity levels and/or trust levels)) or a resolution gradient that ranges with a more granular score, such as 1-100.

Figure 7A:
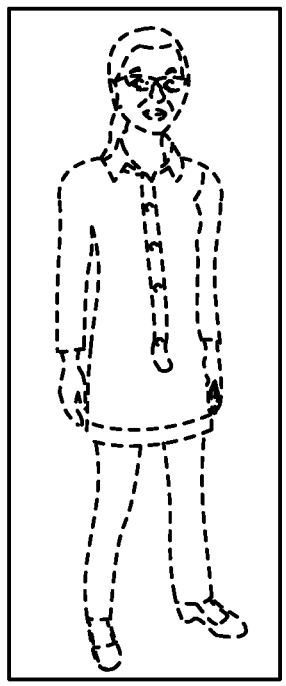
FIGS. 7A and 7B are example representations of a dashed avatar and avatar with a visible border, respectively, in accordance with various aspects and embodiments of the subject disclosure.
Figure 7B:
Figure 8A:
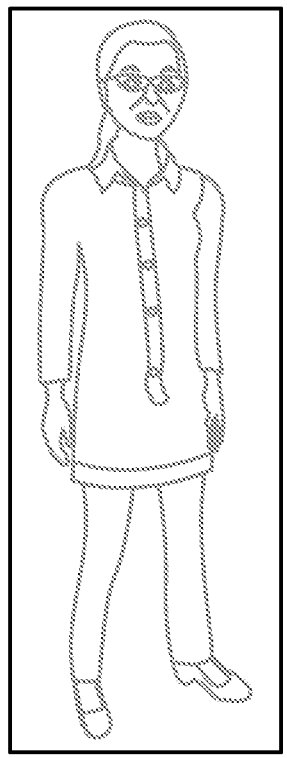
FIG. 8A is an example representation of a modified opacity avatar, in accordance with various aspects and embodiments of the subject disclosure

Moreover, instead of or in addition to modifying resolution, other ways to vary the appearance of an avatar can be used. For example, FIG. 7A shows the user as having a dashed outline and features. FIG. 7B shows the user as presented with a surrounding border, which, for example, may be colored differently, e.g., ranging from red for low familiarity to yellow for medium to green for high familiarity; there may be only one color for each of low, medium or high, for example, or there may be a color gradient that ranges with a more granular score. Trust, as described herein, can also be presented differently. FIG. 8A shows modified opacity as one type of modified representation.

Virtually any way to modify the appearance of a user's avatar based on relationship data, e.g., familiarity and/or trust levels are feasible. Further, any combinations of the above concepts can be used, e.g., resolution for familiarity, a colored border for trust, and so on.

Figure 8B:
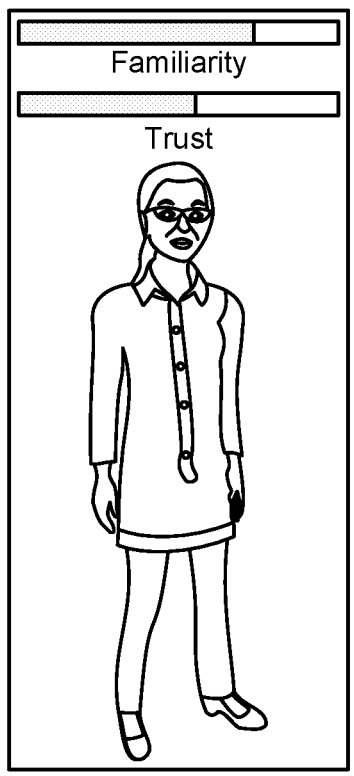
FIG. 8B is an example representation of how an avatar can be presented with accompanying relationship data, in accordance with various aspects and embodiments of the subject disclosure

FIG. 8B shows that the appearance of an avatar can be modified without any changes to the avatar itself. For example, in FIG. 8B, a trust meter and familiarity meter are presented to another user in conjunction with the avatar. These meters can appear at first, intermittently thereafter, e.g., for a few seconds at a time. In this way, one user views the presentation the avatar differently than another user, for example.

Figure 9:
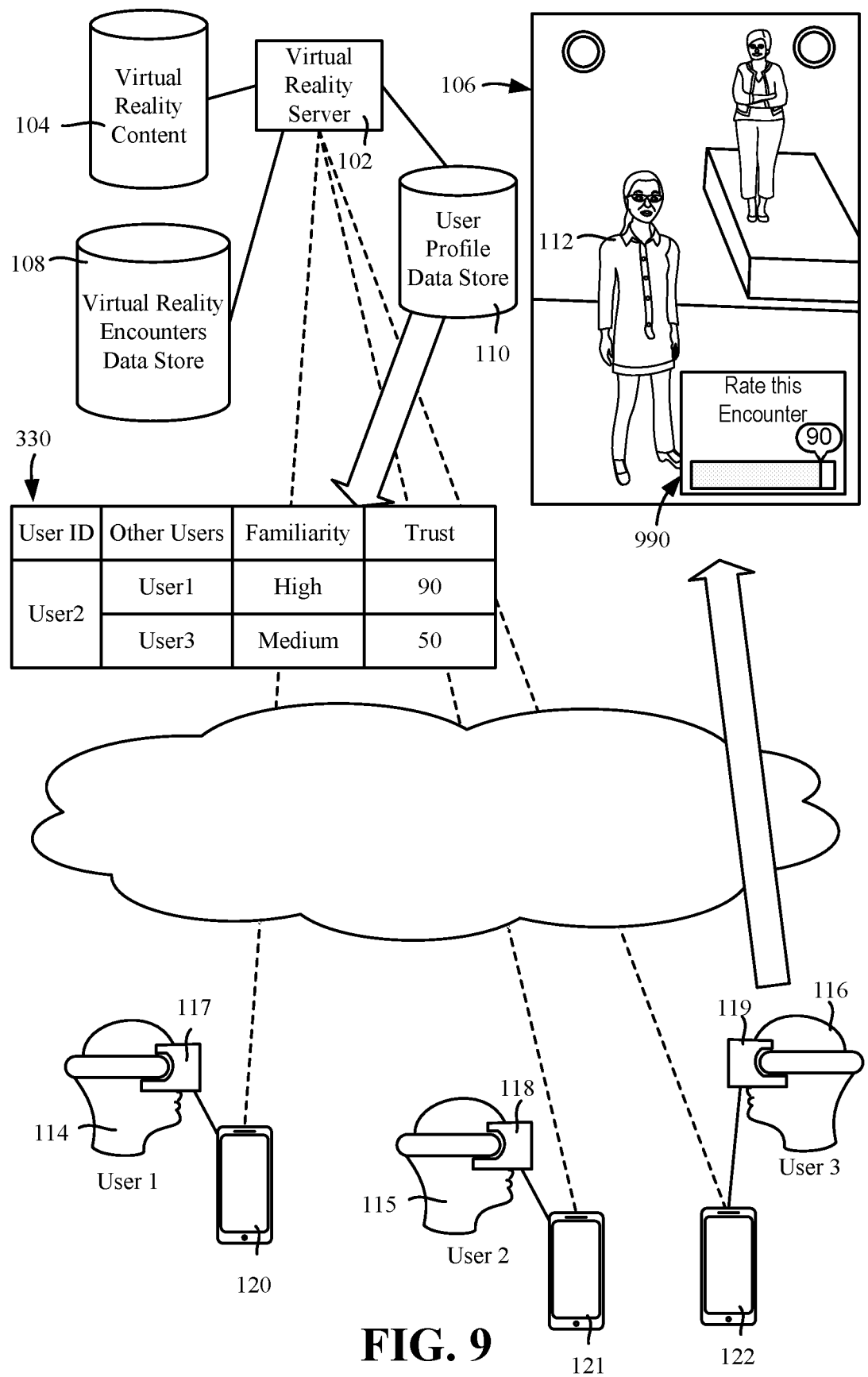
FIG. 9 is a block diagram of an example system and representation of a virtual environment for presenting an avatar in a virtual environment to other users based on relationship data, including an interface to rate an encounter, in accordance with various aspects and embodiments of the subject disclosure.

In another embodiment, as generally represented via the slider control 990 in FIG. 9, one user may rate an encounter of another user. Such a rating may be used to determine the level of trust, which may therefore then be stored in the user profile data store 110. In the same manner in which a level of resolution of a user was determined and presented to another user based on familiarity, the level of trust may be used to determine the presentation of one avatar to another user. Whether using familiarity and/or trust, the visual resolution may be altered as described. Also the audio resolution may include not only an adjustment in the volume level, but also in the clarity of the words that are spoken. For instance, someone who has a low level of trust may be presented as though they are mumbling indistinctively.

It should be noted that a user can inherit a trust level without manual interaction or the like. For example, consider a user X with has a trusted friend user Y, who in turn has a high level of trust rating for some other user Z. Although user X has not input any trust data for user Z, because of their common relationship with user Y, at least some (not necessarily all, such as fifty percent) of the trust rating can be inherited by user X with respect to user Z, and vice versa. As can be appreciated, more than one degree of separation can be considered as well.

A user can interact to change their appearance beforehand rather than during an encounter. For example, a presenter at a virtual reality conference may want everyone to see her avatar clearly even without having any relationship data for most or even all of the attendees. A user's avatar at a virtual work social event may be presented differently, e.g., clearly to everyone, than the user's avatar at a virtual public social event, e.g., modified to respective other users based on respective relationship data therewith.

Figure 10:
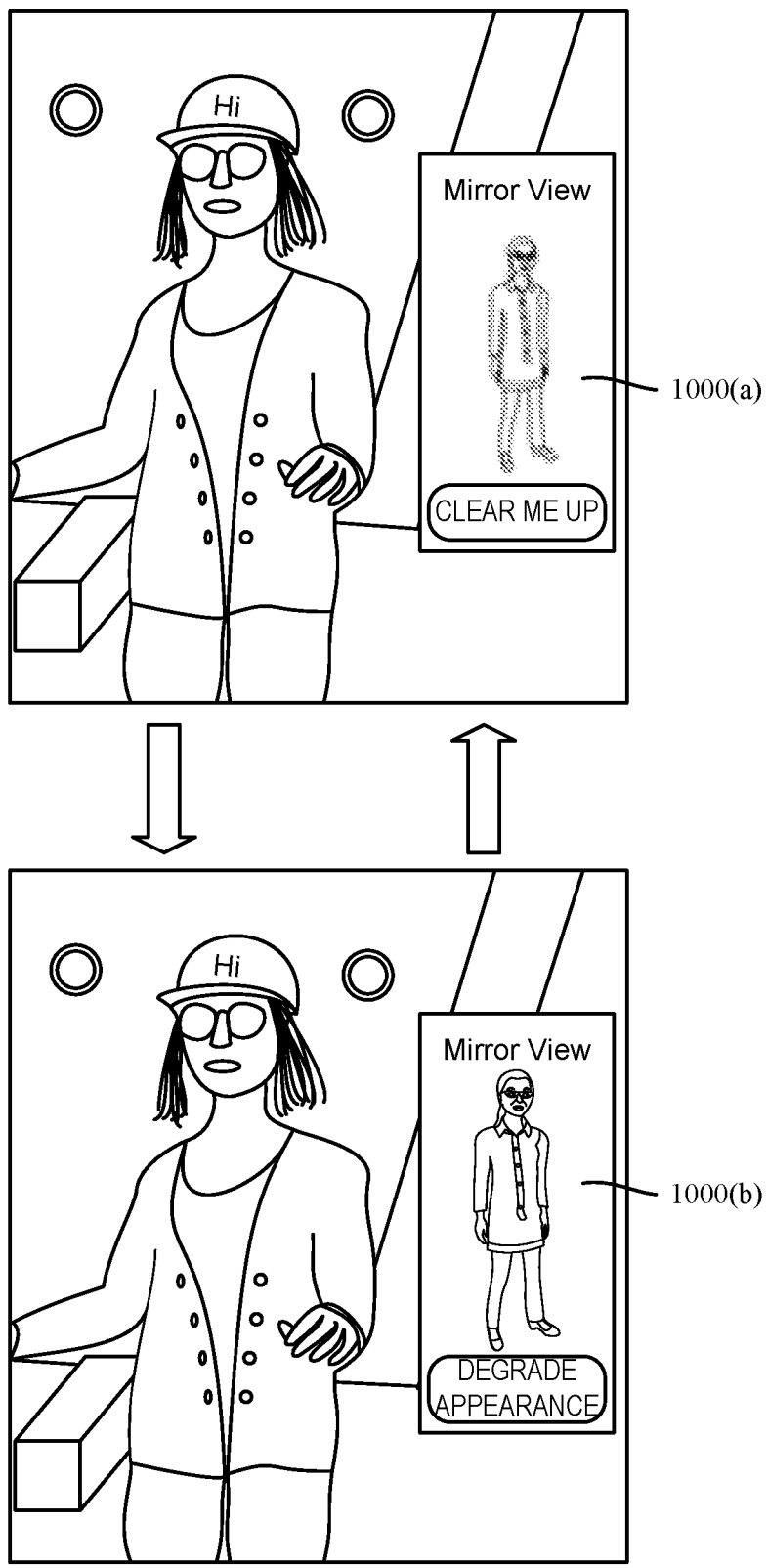
FIG. 10 is an example representation of a mirror view by which a user can see his or her own avatar, and interact to modify the avatar's appearance, in accordance with various aspects and embodiments of the subject disclosure.

Turning to another aspect, as represented in FIG. 10, a user may also be presented with a mirror view representation 1000(*a*) of themselves as they are being presented by the virtual reality server to another user. In this manner, a user may preview what their avatar looks like to the other user and may alter it to improve (to 1000(*b*)) or degrade (back to 1000(*a*)), (possibly in smaller improvement and/or degradation steps at a time), the presentation of their avatar the other user. Although not explicitly shown, it is understood that audio can be improved or degraded while in an encounter, and it is feasible for a user to experience his or her own voice to decide whether to adjust the avatar's aural output during the encounter.

A user may choose to apply one or more filters to their own view of their virtual reality environment as it relates to the presentation of other users avatars within that environment. For example, user 2 may choose to only want to view other users within the environment with a certain relationship level (trust and/or) familiarity to them. The choice of a filter to apply may be instructed by the user to the virtual reality server 102 in any suitable way, such as by spoken command or other commands such as a gesture within a virtual environment menu. Avatars that fall outside of the filter criteria may optionally either be removed by the virtual reality server 102 from presentation or may be pixelated or anonymized or otherwise made generic in their presentation to the user. Note that a user who is applying a filter may have his or her avatar appear differently (if at all) or be anonymized to "filtered out" users. This, for example, can avoid appearing rude (or worse) to the "filtered out" users, who may for example be attempting to converse with someone's avatar that he or she sees, but because of filtering does not see or hear them in return.

Figure 11:
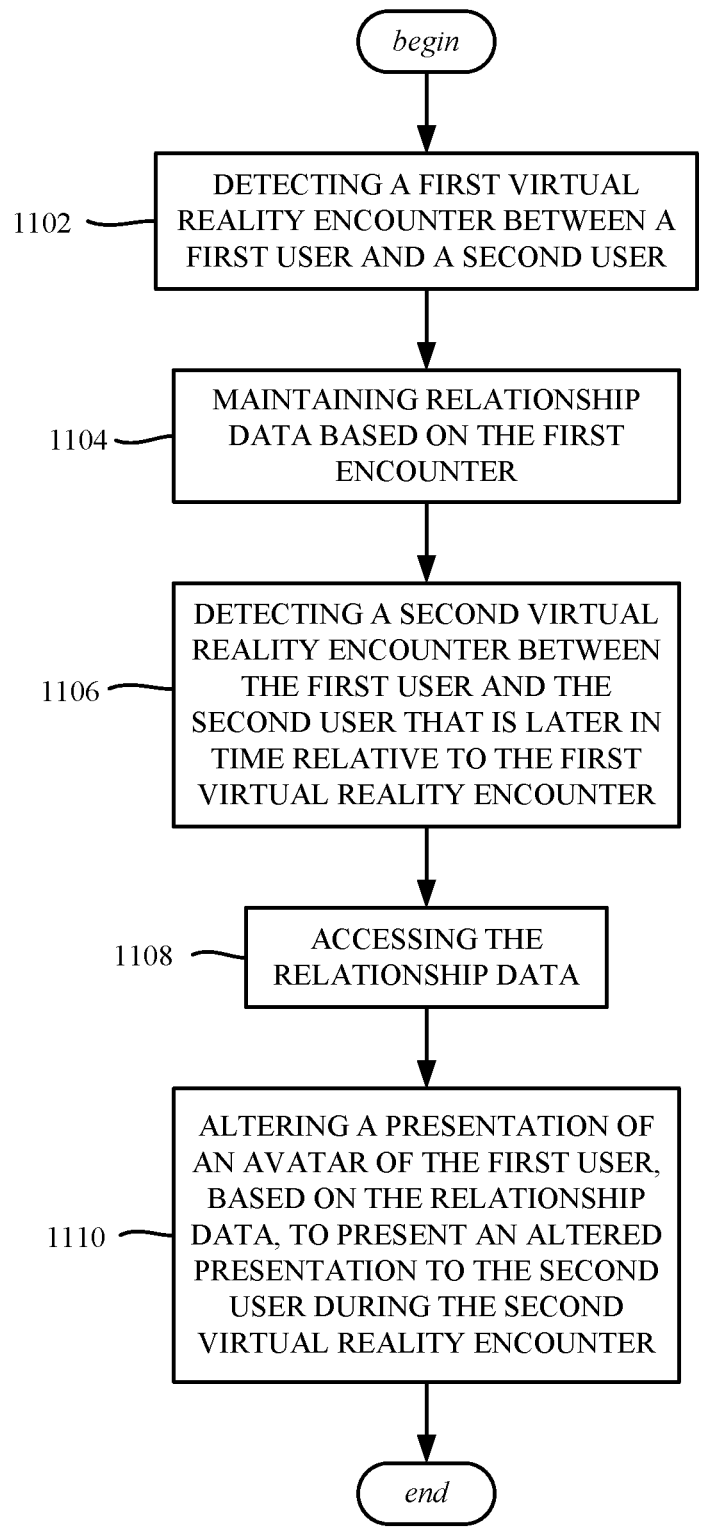
FIG. 11 is a flow diagram representing example operations related to altering a presentation of an avatar in a subsequent encounter based on relationship data of a previous encounter, in accordance with various aspects and embodiments of the subject disclosure.

One or more example aspects are represented in FIG. 11, and can correspond to a system, including a processor, and a memory that stores executable instructions that, when executed by the processor, facilitate performance of operations. Example operation 1102 represents detecting a first virtual reality encounter between a first user and a second user. Example operation 1104 represents maintaining relationship data based on the first encounter. Example operation 1106 represents detecting a second virtual reality encounter between the first user and the second user that is later in time relative to the first virtual reality encounter. Example operation 1108 represents accessing the relationship data. Example operation 1110 represents altering a presentation of an avatar of the first user, based on the relationship data, to present an altered presentation to the second user during the second virtual reality encounter.

The relationship data can include at least one: of trust level data, or familiarity level data.

Further operations can include updating the relationship data based on the second virtual reality encounter. Updating the relationship data based on the second virtual reality encounter can include updating the relationship data based on at least one of: duration of the second virtual reality encounter, conversation detected during the second virtual reality encounter, or manual input data obtained from the first user.

Altering the presentation can include outputting an altered visual representation of the avatar. Outputting the altered visual representation of the avatar can include modifying at least one of: display resolution of the avatar, or opacity of the avatar. Outputting the altered visual representation of the avatar can include outputting an indicator in association with the avatar based on at least part of the relationship data.

Altering the presentation can include can include outputting an altered aural presentation of the avatar.

Further operations can include presenting, to the first user, a representation of the avatar as presented to the second user during the second virtual reality encounter.

Further operations can include filtering out a third user from the first virtual reality encounter based on filtering criterion associated with the first user.

Further operations can include maintaining a representation of the avatar as the avatar appeared during the first virtual reality encounter.

The altered presentation can include a first altered presentation; further operations can include obtaining manual input data from the user during the second virtual reality encounter, and altering the first altered presentation of the avatar of the first user, based on the manual input data, to present a second altered presentation to the second user during the second virtual reality encounter.

Figure 12:
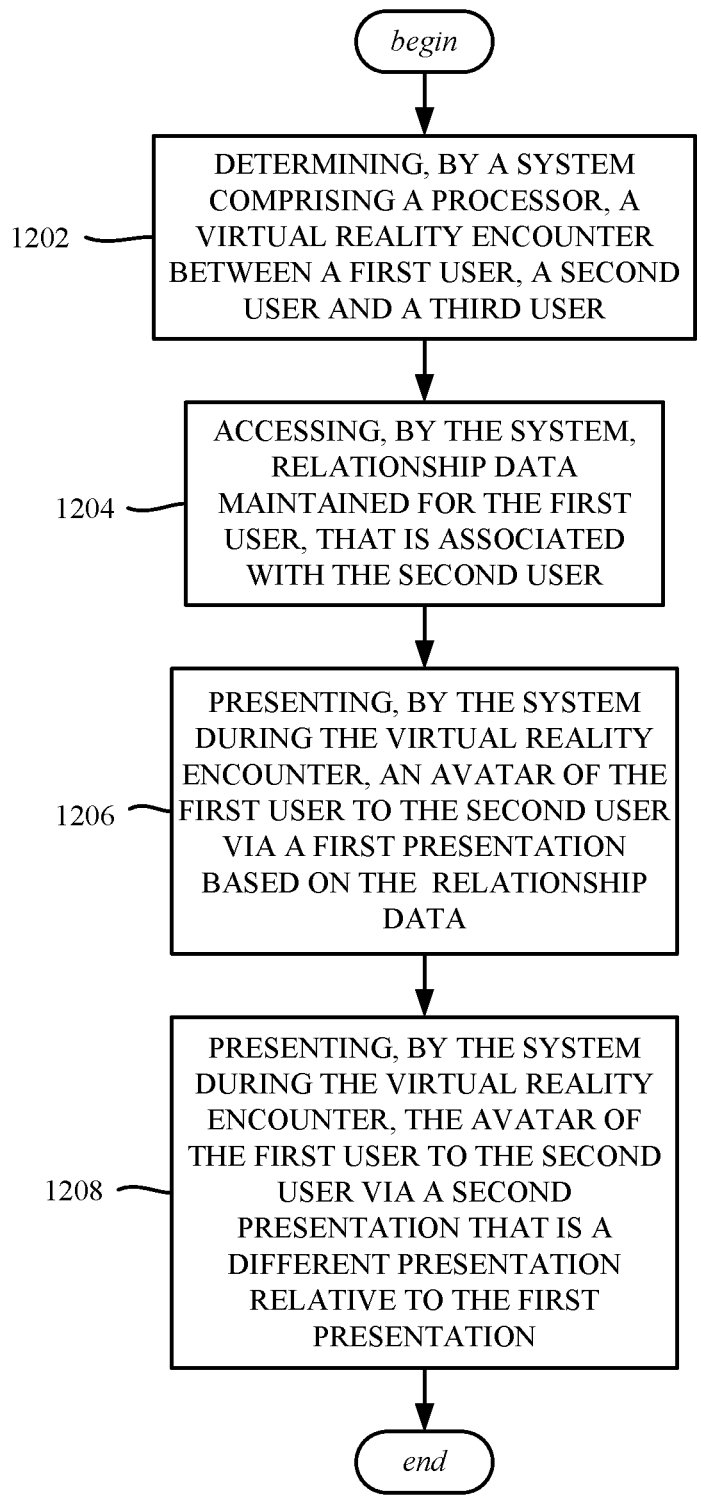
FIG. 12 is a flow diagram representing example operations related to presenting an avatar with different presentations to different users based on relationship data, in accordance with various aspects and embodiments of the subject disclosure.

One or more example aspects are represented in FIG. 12, and, for example, can correspond to operations, such as of a method. Example operation 1202 represents determining, by a system comprising a processor, a virtual reality encounter between a first user, a second user and a third user. Example operation 1204 represents accessing, by the system, relationship data maintained for the first user, that is associated with the second user. Example operation 1206 represents presenting, by the system during the virtual reality encounter, an avatar of the first user to the second user via a first presentation based on the relationship data.

Example operation 1208 represents presenting, by the system during the virtual reality encounter, the avatar of the first user to the second user via a second presentation that is a different presentation relative to the first presentation.

The relationship data can include first relationship data, and further operations can include accessing, by the system, second relationship data maintained for the first user that is associated with the third user, wherein the presenting of the avatar of third first user to the second user via the second presentation is based on the relationship data.

Further operations can include updating, by the system, the first relationship data into first updated relationship data, updating, by the system, the second relationship data into second updated relationship data, and maintaining, by the system, the first updated relationship data and the second updated relationship data.

Determining the virtual reality encounter between the first user, the second user and the third user can include at least one of: detecting when the first user is within a proximate distance to the second user, detecting when the first user is within a proximate distance to the third user, detecting that the avatar is within a field of view of the second user, or detecting that the avatar is within a field of view of the third user.

Figure 13:
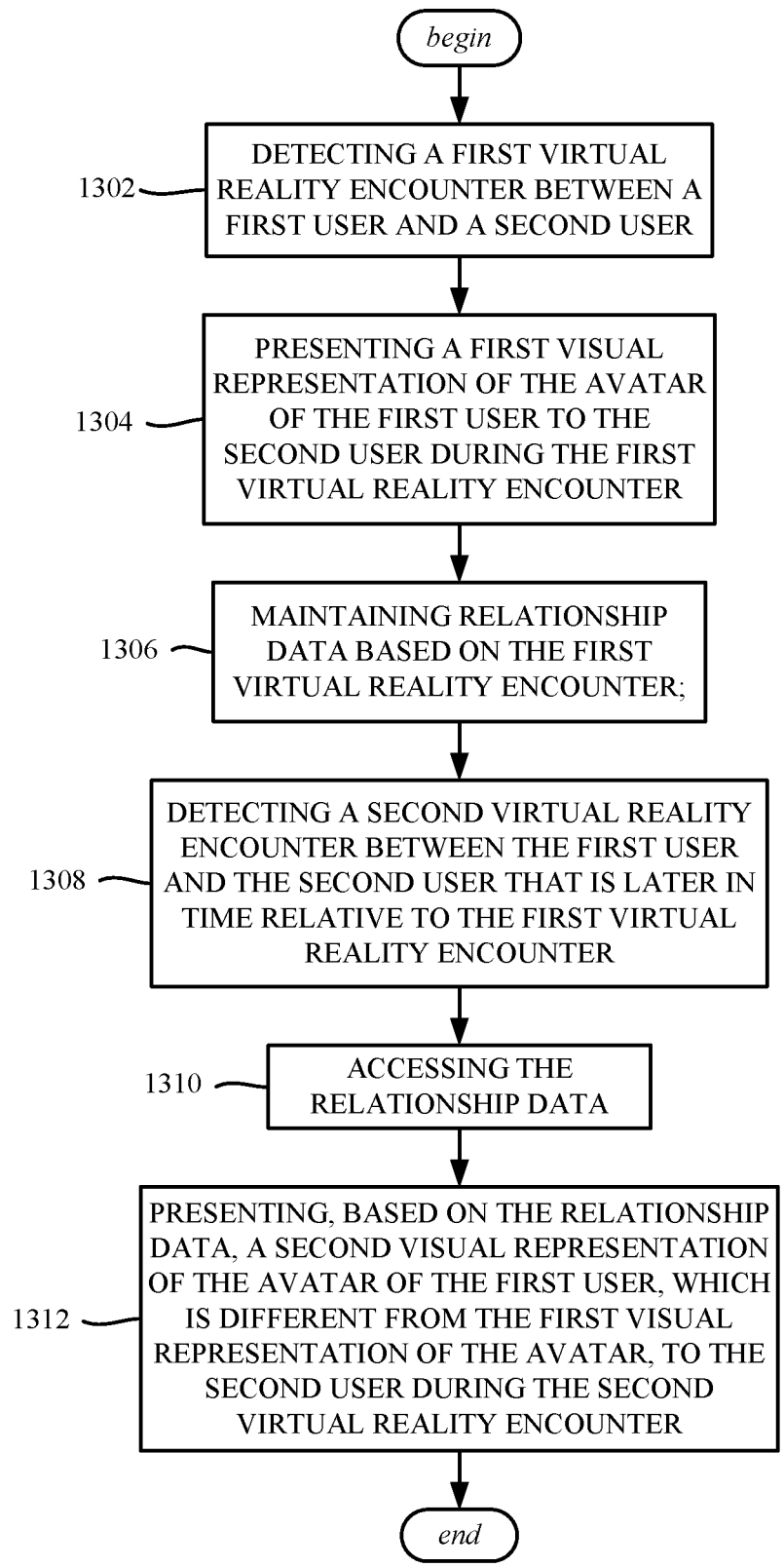
FIG. 13 is a flow diagram representing example operations related to altering a presentation of an avatar of a first user to a second user with different presentations in different encounters, in accordance with various aspects and embodiments of the subject disclosure.

One or more aspects are represented in FIG. 13, such as implemented in a machine-readable medium, including executable instructions that, when executed by a processor, facilitate performance of operations. Example operation 1302 represents detecting a first virtual reality encounter between a first user and a second user. Example operation 1304 represents presenting a first visual representation of the avatar of the first user to the second user during the first virtual reality encounter. Example operation 1306 represents maintaining relationship data based on the first virtual reality encounter. Example operation 1308 represents detecting a second virtual reality encounter between the first user and the second user that is later in time relative to the first virtual reality encounter. Example operation 1310 represents accessing the relationship data. Example operation 1312 represents presenting, based on the relationship data, a second visual representation of the avatar of the first user, which is different from the first visual representation of the avatar, to the second user during the second virtual reality encounter.

Further operations can include obtaining manual input data from the user during the first virtual reality encounter, and altering the first visual representation of the avatar of the first user, based on the manual input data, to present an altered visual representation of the avatar of the first user to the second user during the first virtual reality encounter.

Further operations can include presenting a first aural representation of the avatar of the first user to the second user during the first virtual reality encounter, and presenting, based on the relationship data, a second aural presentation of the avatar of the first user, which is different from the first aural presentation of the avatar, to the second user during the second virtual reality encounter. Presenting the second aural presentation of the avatar of the first user, which is different from the first aural presentation of the avatar, can include outputting at least one of: modified audio volume output level, modified audio clarity level, modified audio timbre, modified pitch, altered voice audio, modified audio frequency, or modified audio equalization settings.

As can be seen, the technology described herein facilitates presenting an avatar of a user in a virtual reality environment to other users who perceive the avatar in that virtual reality environment based on their relationship data with the other users. The level of familiarity with other users may also relate to a level of trust with those other users. A user is thus able to perceive the avatars of other users at a level of visual and aural clarity depending on their level of familiarity and/or trust with those other users. Further, it is useful for the other users to be presented with a similar presentation of a user's avatar.

Turning to aspects in general, a wireless communication system can employ various cellular systems, technologies, and modulation schemes to facilitate wireless radio communications between devices (e.g., a UE and the network equipment). While example embodiments might be described for SG new radio (NR) systems, the embodiments can be applicable to any radio access technology (RAT) or multi-RAT system where the UE operates using multiple carriers e.g. LTE FDD/TDD, GSM/GERAN, CDMA2000 etc. For example, the system can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system are particularly described wherein the devices (e.g., the UEs and the network equipment) of the system are configured to communicate wireless signals using one or more multi carrier modulation schemes, wherein data symbols can be transmitted simultaneously over multiple frequency subcarriers (e.g., OFDM, CP-OFDM, DFT-spread OFDM, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system can be configured to provide and employ SG wireless networking features and functionalities. With SG networks that may use waveforms that split the bandwidth into several sub-bands, different types of services can be accommodated in different sub-bands with the most suitable waveform and numerology, leading to improved spectrum utilization for SG networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications; MIMO can be used for achieving diversity gain, spatial multiplexing gain and beamforming gain.

Note that using multi-antennas does not always mean that MIMO is being used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification's transmission mode 1, which uses a single transmission antenna and a single receive antenna). Or, only one antenna can be used, with various different multiplexing, precoding methods etc.

The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (including both open-loop and closed-loop), beamforming, and codebook-based precoding can also be used to address issues such as efficiency, interference, and range.

Figure 14:
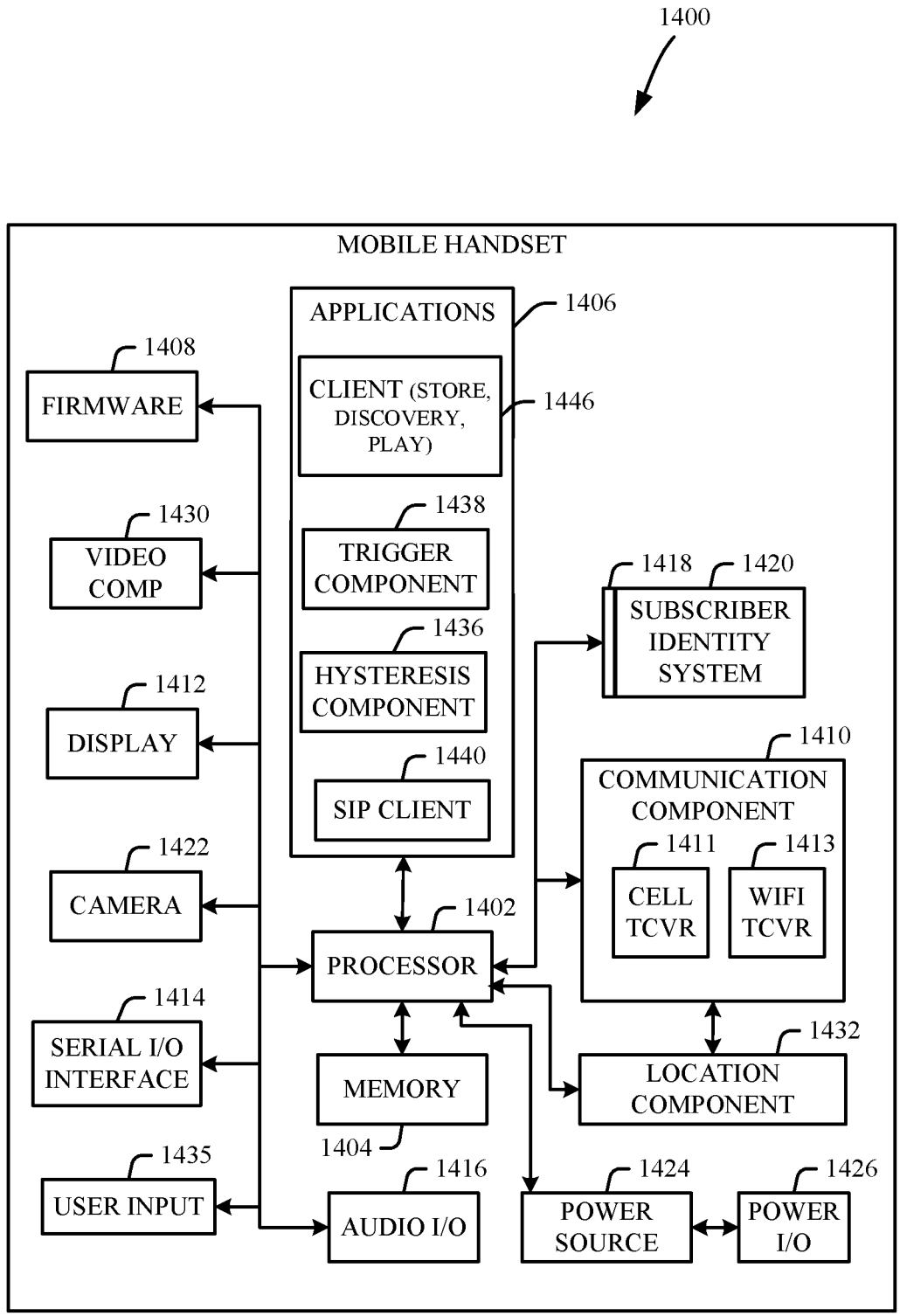
FIG. 14 illustrates an example block diagram of an example mobile handset operable to engage in a system architecture that facilitates wireless communications according to one or more embodiments described herein.

Referring now to FIG. 14, illustrated is a schematic block diagram of an example end-user device (such as user equipment) that can be a mobile device 1400 capable of connecting to a network in accordance with some embodiments described herein. Although a mobile handset 1400 is illustrated herein, it will be understood that other devices can be a mobile device, and that the mobile handset 1400 is merely illustrated to provide context for the embodiments of the various embodiments described herein. The following discussion is intended to provide a brief, general description of an example of a suitable environment 1400 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can include computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1400 includes a processor 1402 for controlling and processing all onboard operations and functions. A memory 1404 interfaces to the processor 1402 for storage of data and one or more applications 1406 (e.g., a video player software, user feedback component software, etc.). Other applications can include voice recognition of predetermined voice commands that facilitate initiation of the user feedback signals. The applications 1406 can be stored in the memory 1404 and/or in a firmware 1408, and executed by the processor 1402 from either or both the memory 1404 or/and the firmware 1408. The firmware 1408 can also store startup code for execution in initializing the handset 1400. A communications component 1410 interfaces to the processor 1402 to facilitate wired/wireless communication with external systems, e.g., cellular networks, VoIP networks, and so on. Here, the communications component 1410 can also include a suitable cellular transceiver 1411 (e.g., a GSM transceiver) and/or an unlicensed transceiver 1413 (e.g., Wi-Fi, WiMax) for corresponding signal communications. The handset 1400 can be a device such as a cellular telephone, a PDA with mobile communications capabilities, and messaging-centric devices. The communications component 1410 also facilitates communications reception from terrestrial radio networks (e.g., broadcast), digital satellite radio networks, and Internet-based radio services networks.

The handset 1400 includes a display 1412 for displaying text, images, video, telephony functions (e.g., a Caller ID function), setup functions, and for user input. For example, the display 1412 can also be referred to as a "screen" that can accommodate the presentation of multimedia content (e.g., music metadata, messages, wallpaper, graphics, etc.). The display 1412 can also display videos and can facilitate the generation, editing and sharing of video quotes. A serial I/O interface 1414 is provided in communication with the processor 1402 to facilitate wired and/or wireless serial communications (e.g., USB, and/or IEEE 1494) through a hardwire connection, and other serial input devices (e.g., a keyboard, keypad, and mouse). This supports updating and troubleshooting the handset 1400, for example. Audio capabilities are provided with an audio I/O component 1416, which can include a speaker for the output of audio signals related to, for example, indication that the user pressed the proper key or key combination to initiate the user feedback signal. The audio I/O component 1416 also facilitates the input of audio signals through a microphone to record data and/or telephony voice data, and for inputting voice signals for telephone conversations.

The handset 1400 can include a slot interface 1418 for accommodating a SIC (Subscriber Identity Component) in the form factor of a card Subscriber Identity Module (SIM) or universal SIM 1420, and interfacing the SIM card 1420 with the processor 1402. However, it is to be appreciated that the SIM card 1420 can be manufactured into the handset 1400, and updated by downloading data and software.

The handset 1400 can process IP data traffic through the communication component 1410 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 1422 (e.g., a camera) can be provided for decoding encoded multimedia content. The video processing component 1422 can aid in facilitating the generation, editing and sharing of video quotes. The handset 1400 also includes a power source 1424 in the form of batteries and/or an AC power subsystem, which power source 1424 can interface to an external power system or charging equipment (not shown) by a power I/O component 1426.

The handset 1400 can also include a video component 1430 for processing video content received and, for recording and transmitting video content. For example, the video component 1430 can facilitate the generation, editing and sharing of video quotes. A location tracking component 1432 facilitates geographically locating the handset 1400. As described hereinabove, this can occur when the user initiates the feedback signal automatically or manually. A user input component 1434 facilitates the user initiating the quality feedback signal. The user input component 1434 can also facilitate the generation, editing and sharing of video quotes. The user input component 1434 can include such conventional input device technologies such as a keypad, keyboard, mouse, stylus pen, and/or touch screen, for example.

Referring again to the applications 1406, a hysteresis component 1436 facilitates the analysis and processing of hysteresis data, which is utilized to determine when to associate with the access point. A software trigger component 1438 can be provided that facilitates triggering of the hysteresis component 1438 when the Wi-Fi transceiver 1413 detects the beacon of the access point. A SIP client 1440 enables the handset 1400 to support SIP protocols and register the subscriber with the SIP registrar server. The applications 1406 can also include a client 1442 that provides at least the capability of discovery, play and store of multimedia content, for example, music.

The handset 1400, as indicated above related to the communications component 810, includes an indoor network radio transceiver 1413 (e.g., Wi-Fi transceiver). This function supports the indoor radio link, such as IEEE 802.11, for the dual-mode GSM handset 1400. The handset 1400 can accommodate at least satellite radio services through a handset that can combine wireless voice and digital radio chipsets into a single handheld device.

Figure 15:
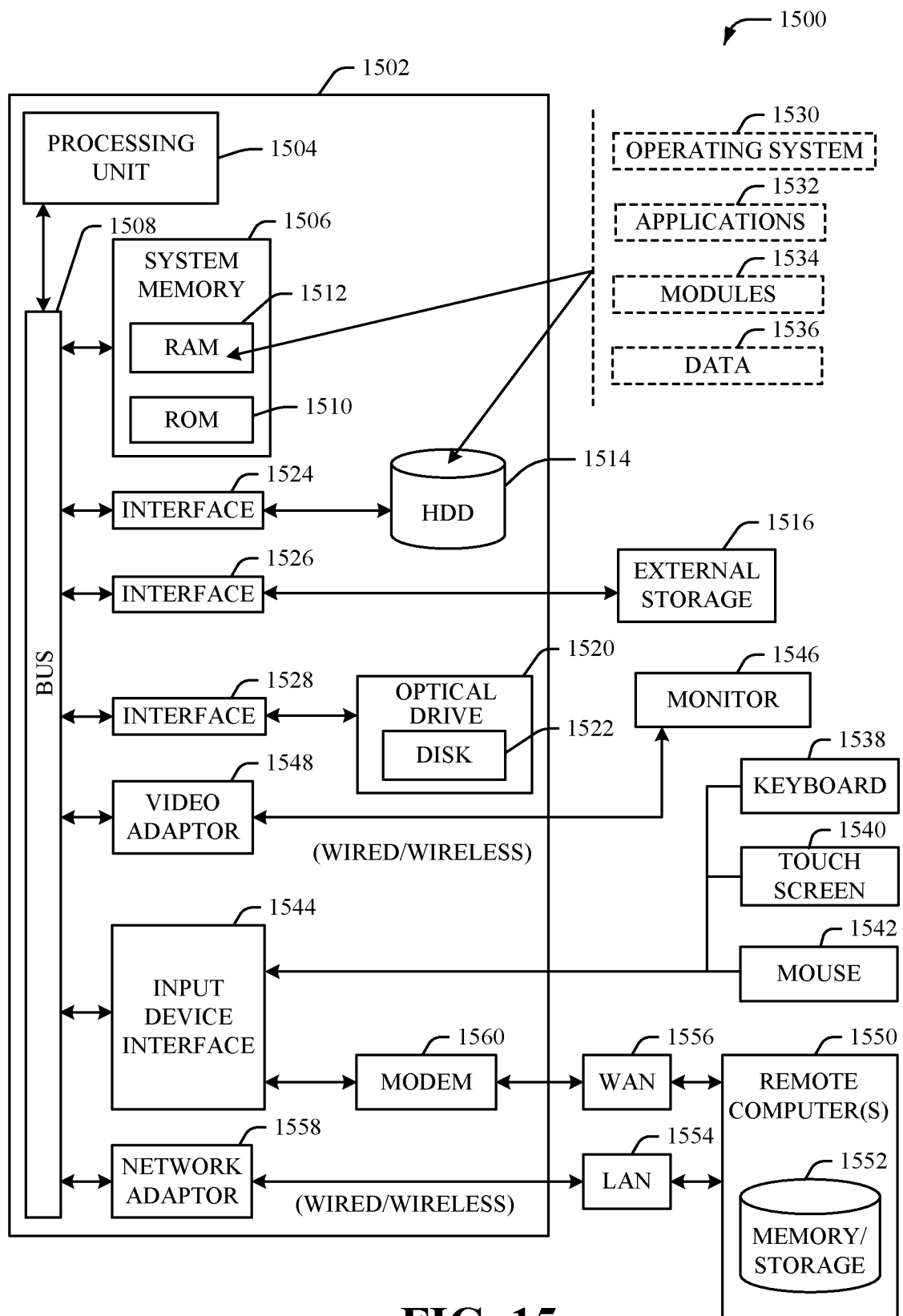
FIG. 15 illustrates an example block diagram of an example computer/machine system operable to engage in a system architecture that facilitates wireless communications according to one or more embodiments described herein.

In order to provide additional context for various embodiments described herein, FIG. 15 and the following discussion are intended to provide a brief, general description of a suitable computing environment 1500 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 15, the example environment 1500 for implementing various embodiments of the aspects described herein includes a computer 1502, the computer 1502 including a processing unit 1504, a system memory 1506 and a system bus 1508. The system bus 1508 couples system components including, but not limited to, the system memory 1506 to the processing unit 1504. The processing unit 1504 can be any of various commercially available processors. Dual microprocessors and other multi-processor architectures can also be employed as the processing unit 1504.

The system bus 1508 can be any of several types of bus structure that can further interconnect to a memory bus (with or without a memory controller), a peripheral bus, and a local bus using any of a variety of commercially available bus architectures. The system memory 1506 includes ROM 1510 and RAM 1512. A basic input/output system (BIOS) can be stored in a non-volatile memory such as ROM, erasable programmable read only memory (EPROM), EEPROM, which BIOS contains the basic routines that help to transfer information between elements within the computer 1502, such as during startup. The RAM 1512 can also include a high-speed RAM such as static RAM for caching data.

The computer 1502 further includes an internal hard disk drive (HDD) 1514 (e.g., EIDE, SATA), one or more external storage devices 1516 (e.g., a magnetic floppy disk drive (FDD) 1516, a memory stick or flash drive reader, a memory card reader, etc.) and an optical disk drive 1520 (e.g., which can read or write from a CD-ROM disc, a DVD, a BD, etc.). While the internal HDD 1514 is illustrated as located within the computer 1502, the internal HDD 1514 can also be configured for external use in a suitable chassis (not shown). Additionally, while not shown in environment 1500, a solid state drive (SSD), non-volatile memory and other storage technology could be used in addition to, or in place of, an HDD 1514, and can be internal or external. The HDD 1514, external storage device(s) 1516 and optical disk drive 1520 can be connected to the system bus 1508 by an HDD interface 1524, an external storage interface 1526 and an optical drive interface 1528, respectively. The interface 1524 for external drive implementations can include at least one or both of Universal Serial Bus (USB) and Institute of Electrical and Electronics Engineers (IEEE) 1494 interface technologies. Other external drive connection technologies are within contemplation of the embodiments described herein.

The drives and their associated computer-readable storage media provide nonvolatile storage of data, data structures, computer-executable instructions, and so forth. For the computer 1502, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1512, including an operating system 1530, one or more application programs 1532, other program modules 1534 and program data 1536. All or portions of the operating system, applications, modules, and/or data can also be cached in the RAM 1512. The systems and methods described herein can be implemented utilizing various commercially available operating systems or combinations of operating systems.

Computer 1502 can optionally include emulation technologies. For example, a hypervisor (not shown) or other intermediary can emulate a hardware environment for operating system 1530, and the emulated hardware can optionally be different from the hardware illustrated in FIG. 15. In such an embodiment, operating system 1530 can include one virtual machine (VM) of multiple VMs hosted at computer 1502. Furthermore, operating system 1530 can provide runtime environments, such as the Java runtime environment or the .NET framework, for applications 1532. Runtime environments are consistent execution environments that allow applications 1532 to run on any operating system that includes the runtime environment. Similarly, operating system 1530 can support containers, and applications 1532 can be in the form of containers, which are lightweight, standalone, executable packages of software that include, e.g., code, runtime, system tools, system libraries and settings for an application.

Further, computer 1502 can be enabled with a security module, such as a trusted processing module (TPM). For instance with a TPM, boot components hash next in time boot components, and wait for a match of results to secured values, before loading a next boot component. This process can take place at any layer in the code execution stack of computer 1502, e.g., applied at the application execution level or at the operating system (OS) kernel level, thereby enabling security at any level of code execution.

A user can enter commands and information into the computer 1502 through one or more wired/wireless input devices, e.g., a keyboard 1538, a touch screen 1540, and a pointing device, such as a mouse 1542. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1504 through an input device interface 1544 that can be coupled to the system bus 1508, but can be connected by other interfaces, such as a parallel port, an IEEE 1494 serial port, a game port, a USB port, an IR interface, a BLUETOOTH® interface, etc.

A monitor 1546 or other type of display device can be also connected to the system bus 1508 via an interface, such as a video adapter 1548. In addition to the monitor 1546, a computer typically includes other peripheral output devices (not shown), such as speakers, printers, etc.

The computer 1502 can operate in a networked environment using logical connections via wired and/or wireless communications to one or more remote computers, such as a remote computer(s) 1550. The remote computer(s) 1550 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1552 is illustrated. The logical connections depicted include wired/wireless connectivity to a local area network (LAN) 1554 and/or larger networks, e.g., a wide area network (WAN) 1556. Such LAN and WAN networking environments are commonplace in offices and companies, and facilitate enterprise-wide computer networks, such as intranets, all of which can connect to a global communications network, e.g., the Internet.

When used in a LAN networking environment, the computer 1502 can be connected to the local network 1554 through a wired and/or wireless communication network interface or adapter 1558. The adapter 1558 can facilitate wired or wireless communication to the LAN 1554, which can also include a wireless access point (AP) disposed thereon for communicating with the adapter 1558 in a wireless mode.

When used in a WAN networking environment, the computer 1502 can include a modem 1560 or can be connected to a communications server on the WAN 1556 via other means for establishing communications over the WAN 1556, such as by way of the Internet. The modem 1560, which can be internal or external and a wired or wireless device, can be connected to the system bus 1508 via the input device interface 1544. In a networked environment, program modules depicted relative to the computer 1502 or portions thereof, can be stored in the remote memory/storage device 1552. It will be appreciated that the network connections shown are example and other means of establishing a communications link between the computers can be used.

When used in either a LAN or WAN networking environment, the computer 1502 can access cloud storage systems or other network-based storage systems in addition to, or in place of, external storage devices 1516 as described above. Generally, a connection between the computer 1502 and a cloud storage system can be established over a LAN 1554 or WAN 1556 e.g., by the adapter 1558 or modem 1560, respectively. Upon connecting the computer 1502 to an associated cloud storage system, the external storage interface 1526 can, with the aid of the adapter 1558 and/or modem 1560, manage storage provided by the cloud storage system as it would other types of external storage. For instance, the external storage interface 1526 can be configured to provide access to cloud storage sources as if those sources were physically connected to the computer 1502.

The computer 1502 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 8 GHz radio bands, at an 15 Mbps (802.11b) or 84 Mbps (802.11a) data rate, for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. In addition, memory components or memory elements can be removable or stationary. Moreover, memory can be internal or external to a device or component, or removable or stationary. Memory can include various types of media that are readable by a computer, such as hard-disc drives, zip drives, magnetic cassettes, flash memory cards or other types of memory cards, cartridges, or the like.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to include, without being limited, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments include a system as well as a computer-readable medium having computer-executable instructions for performing the acts and/or events of the various methods.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communications media include wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A system, comprising:
a processor; and
a memory that stores executable instructions that, when executed by the processor of the system, facilitate performance of operations, the operations comprising:
detecting a first virtual reality encounter between a first user and a second user;
maintaining relationship data based on the first virtual reality encounter, wherein the relationship data comprises a trust level between the first user and the second user;
detecting a second virtual reality encounter between the first user and the second user that is later in time relative to the first virtual reality encounter;
accessing the relationship data including the trust level; and
altering a presentation of an avatar of the first user, based on the relationship data, to present an altered presentation to the second user during the second virtual reality encounter, wherein the altering of the presentation comprises altering a resolution of the avatar of the first user based on the trust level and altering audio output of the avatar of the first user based on the trust level, wherein the altering of the audio output of the avatar of the first user comprises altering clarity of the audio output of the avatar of the first user.

2. The system of claim 1, wherein the relationship data further comprises familiarity level data.

3. The system of claim 1, wherein the operations further comprise, updating the relationship data based on the second virtual reality encounter.

4. The system of claim 3, wherein the updating of the relationship data based on the second virtual reality encounter comprises updating the relationship data based on at least one of: duration of the second virtual reality encounter, conversation detected during the second virtual reality encounter, or manual input data obtained from the first user.

5. The system of claim 1, wherein the altering of the presentation comprises outputting an altered visual representation of the avatar.

6. The system of claim 5, wherein the outputting of the altered visual representation of the avatar comprises modifying opacity of the avatar.

7. The system of claim 5, wherein the outputting of the altered visual representation of the avatar comprises outputting an indicator in association with the avatar based on at least part of the relationship data.

8. The system of claim 1, wherein altering audio output of the avatar of the first user comprises altering the clarity of the audio output of the avatar of the first user based on user-generated input.

9. The system of claim 1, wherein the operations further comprise presenting, to the first user, a representation of the avatar as presented to the second user during the second virtual reality encounter.

10. The system of claim 1, wherein the operations further comprise filtering out a third user from the first virtual reality encounter based on filtering criterion associated with the first user.

11. The system of claim 1, wherein the operations further comprise maintaining a representation of the avatar as the avatar appeared during the first virtual reality encounter.

12. The system of claim 1, wherein the altered presentation comprises a first altered presentation, and wherein the operations further comprise obtaining manual input data from the user during the second virtual reality encounter, and altering the first altered presentation of the avatar of the first user, based on the manual input data, to present a second altered presentation to the second user during the second virtual reality encounter.

13. A method, comprising:
determining, by a system comprising a processor, a virtual reality encounter between a first user, a second user and a third user;
accessing, by the system, relationship data maintained for the first user, that is associated with the second user, wherein the relationship data comprises a trust level between the first user and the second user;
presenting, by the system during the virtual reality encounter, an avatar of the first user to the second user via a first presentation based on the relationship data; and
presenting, by the system during the virtual reality encounter, the avatar of the first user to the second user via a second presentation that is at a different resolution relative to the first presentation based on the trust level and altering, by the system during the virtual reality encounter, audio output of the avatar of the first user based on the trust level, wherein the altering of the audio output of the avatar of the first user comprises altering, by the system during the virtual reality encounter, clarity of the audio output of the avatar of the first user.

14. The method of claim 13, wherein the relationship data comprises first relationship data, and further comprising accessing, by the system, second relationship data maintained for the first user that is associated with the third user, wherein the presenting of the avatar of the first user to the second user via the second presentation is based on the relationship data.

15. The method of claim 14, further comprising updating, by the system, the first relationship data into first updated relationship data, updating, by the system, the second relationship data into second updated relationship data, and maintaining, by the system, the first updated relationship data and the second updated relationship data.

16. The method of claim 13, wherein the determining of the virtual reality encounter between the first user, the second user and the third user comprises at least one of: detecting when the first user is within a proximate distance to the second user, detecting when the first user is within a proximate distance to the third user, detecting that the avatar is within a field of view of the second user, or detecting that the avatar is within a field of view of the third user.

17. A non-transitory machine-readable medium, comprising executable instructions that, when executed by a processor, facilitate performance of operations, the operations comprising:
- detecting a first virtual reality encounter between a first user and a second user;
- presenting a first visual representation of an avatar of the first user to the second user during the first virtual reality encounter;
- maintaining relationship data based on the first virtual reality encounter, wherein the relationship data comprises a trust level between the first user and the second user;
- detecting a second virtual reality encounter between the first user and the second user that is later in time relative to the first virtual reality encounter;
- accessing the relationship data including the trust level; and
- presenting, based on the relationship data, a second visual representation of the avatar of the first user, which is at a different resolution from the first visual representation of the avatar based on the trust level and altering audio output of the avatar of the first user based on the trust level, to the second user during the second virtual reality encounter, wherein the altering of the audio output of the avatar of the first user comprises altering audio output of the avatar of the first user comprises altering clarity of the audio output of the first user.

18. The non-transitory machine-readable medium of claim 17, wherein the operations further comprise obtaining manual input data from the user during the first virtual reality encounter, and altering the first visual representation of the avatar of the first user, based on the manual input data, to present an altered visual representation of the avatar of the first user to the second user during the first virtual reality encounter.

19. The non-transitory machine-readable medium of claim 17, wherein the operations further comprise presenting a first aural representation of the avatar of the first user to the second user during the first virtual reality encounter, and presenting, based on the relationship data, a second aural presentation of the avatar of the first user, which is different from the first aural presentation of the avatar, to the second user during the second virtual reality encounter.

20. The non-transitory machine-readable medium of claim 19, wherein the presenting of the second aural presentation of the avatar of the first user, which is different from the first aural presentation of the avatar, comprises outputting at least one of: modified audio volume output level, modified audio clarity level, modified audio timbre, modified pitch, altered voice audio, modified audio frequency, or modified audio equalization settings.

* * * * *

UNITED STATES PATENT AND TRADEMARK OFFICE
CERTIFICATE OF CORRECTION

| | |
|---|---|
| PATENT NO. | : 12,254,529 B2 |
| APPLICATION NO. | : 17/820319 |
| DATED | : March 18, 2025 |
| INVENTOR(S) | : Bradley et al. |

It is certified that error appears in the above-identified patent and that said Letters Patent is hereby corrected as shown below:

In the Specification

- In Column 10, Line 14, "SG" should read "5G"
- In Column 10, Line 57, "SG" should read "5G"
- In Column 10, Line 58, "SG" should read "5G"
- In Column 10, Line 62, "SG" should read "5G"

Signed and Sealed this
Ninth Day of December, 2025

John A. Squires
*Director of the United States Patent and Trademark Office*